(12) United States Patent
Gaignet et al.

(10) Patent No.: US 7,578,936 B2
(45) Date of Patent: Aug. 25, 2009

(54) SYSTEM COMPRISING FLUID TREATMENT MODULE AND A SUPPORT STRUCTURE

(75) Inventors: Yves Gaignet, Montigny le Bretonneux (FR); Denis Daulasim, Bois d'Arcy (FR); Jacques Moulin, Domaine de Gatines (FR)

(73) Assignee: Millipore Corporation, Billerica, MA (US)

( * ) Notice: Subject to any disclaimer, the term of this patent is extended or adjusted under 35 U.S.C. 154(b) by 837 days.

(21) Appl. No.: 10/524,383

(22) PCT Filed: Sep. 24, 2003

(86) PCT No.: PCT/IB03/04659

§ 371 (c)(1),
(2), (4) Date: Sep. 6, 2005

(87) PCT Pub. No.: WO2004/028661

PCT Pub. Date: Apr. 8, 2004

(65) Prior Publication Data

US 2006/0102546 A1    May 18, 2006

(30) Foreign Application Priority Data

Sep. 26, 2002 (FR) .................... 02 11912

(51) Int. Cl.
*B01D 27/08* (2006.01)
*B01D 35/30* (2006.01)

(52) U.S. Cl. ..................... 210/232; 210/444

(58) Field of Classification Search ................. 210/232, 210/444
See application file for complete search history.

(56) References Cited

U.S. PATENT DOCUMENTS 3,727,764 A * 4/1973 Ogden ................. 210/232
2001/0045386 A1 * 11/2001 Stankowski et al. ......... 210/235
2002/0079695 A1    6/2002 Campbell et al.

FOREIGN PATENT DOCUMENTS

| EP | 0818228 | 9/2003 |
| WO | WO 00/02650 | 1/2000 |
| WO | WO 03/022388 | 3/2003 |
| WO | WO 03/031020 | 4/2003 |

* cited by examiner

*Primary Examiner*—Thomas M Lithgow

(57) ABSTRACT

A system comprising a fluid treatment assembly and means for feeding the assembly with fluid to be treated and receiving treated fluid, comprising a structure (12) on which the assembly is adapted to be removably mounted, to interengage complementary connectors thereof with each other, is characterized in that it includes cooperating functional surfaces (25) formed on the assembly and the structure (12) so that they can enter into mutual contact to immobilize the assembly against movement in translation and keep the connectors interengaged with each other when the assembly is mounted on the structure (12) and to allow the assembly to be released in order to remove it from the structure (12) by exerting on the assembly an action limited to tilting it relative to the structure (12) and guided by the connectors interengaged with each other.

9 Claims, 4 Drawing Sheets

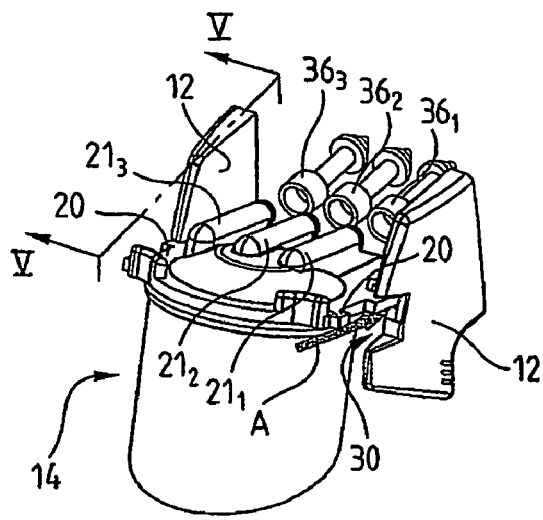
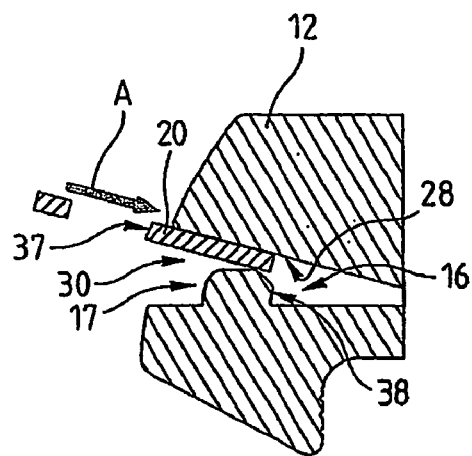
Fig. 4a
Fig. 5a
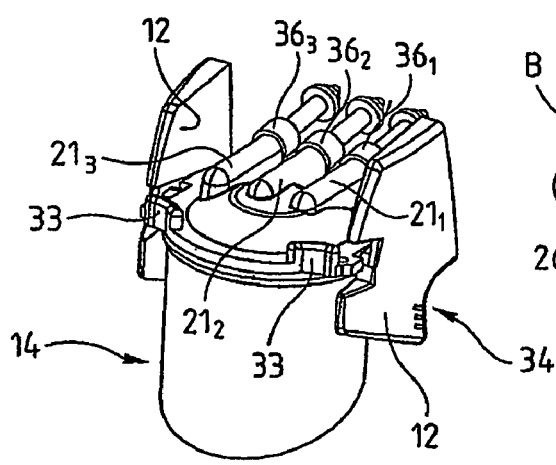
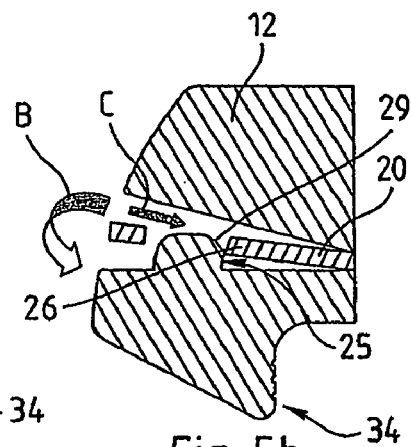
Fig. 4b
Fig. 5b
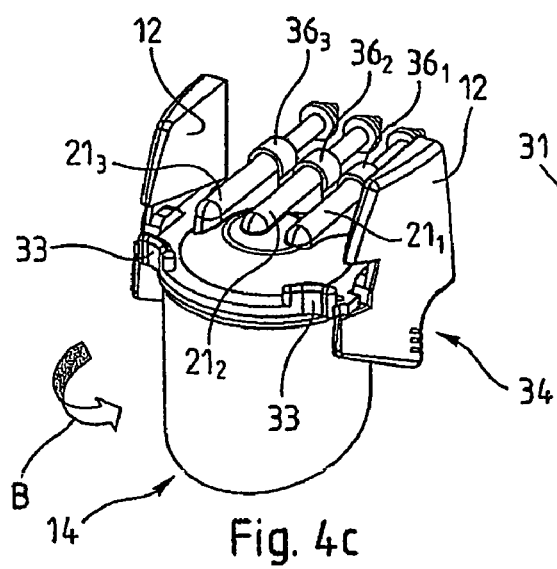
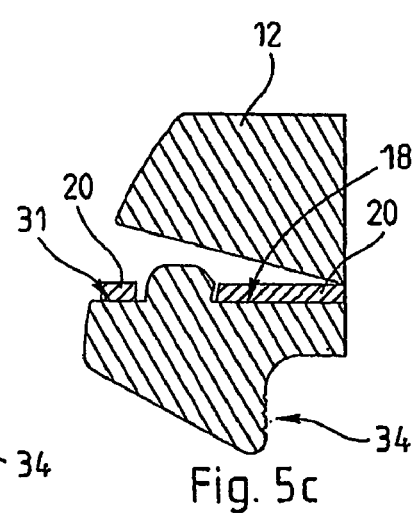
Fig. 4c
Fig. 5c

SYSTEM COMPRISING FLUID TREATMENT MODULE AND A SUPPORT STRUCTURE

CROSS REFERENCE TO RELATED APPLICATIONS

This application is the U.S. National Stage Application of International Application No.: PCT/IB2003/004659, filed on Sep. 24, 2003, which claims priority to French Application No.: 0211912, filed Sep. 26, 2002.

The present invention relates to a fluid treatment system comprising a fluid treatment assembly and means for feeding the treatment assembly with fluid to be treated and for receiving the treated fluid, said means including a support structure on which the treatment assembly is intended to be removably mounted in order to interengage with each other complementary connectors of the treatment assembly and of the feeding and receiving means to establish a flow of the fluid from the feeding and receiving means to the treatment assembly and vice versa.

The present invention is directed more particularly to the situation in which the fluid treatment assembly includes at least one module for treating fluid by reverse osmosis, nanofiltration, ultrafiltration or tangential microfiltration.

Systems of the above kind are used among other things to produce purified water, in particular ultrapure water.

Each module must be immobilized against movement in translation when mounted on the feeding and receiving means—usually, although not exclusively, consisting of a unit for producing purified water—in order to maintain the complementary connectors interengaged with each other, in particular against the pressure exerted by the fluid flowing in the connectors. This is known in the art.

In one arrangement already known in the art, the unit is provided, to this end, with a connecting device including two supports oriented face to face and each forming a bearing surface for a corresponding lateral extension of the module. Each support includes a notch receiving the longitudinal end of the corresponding lateral extension to immobilize the module against movement in translation.

To replace it, the module is released by pushing it toward the unit to extract each extension from the associated notch, and then tilting the head of the module toward the unit to move the extension away from the notch. The module can then be removed from the connecting device.

Pushing on the module to release it almost always results in movement of the unit.

A general object of the present invention is an arrangement that alleviates this drawback and has other advantages.

To be more precise, the present invention provides a fluid treatment system including a fluid treatment assembly and means for feeding the treatment assembly with fluid to be treated and receiving treated fluid, the means including a support structure on which the treatment assembly is adapted to be removably mounted to interengage with each other complementary connectors of the treatment assembly and the feeding and receiving means to establish a flow of fluid from the feeding and receiving means toward the treatment assembly and vice versa, which system is characterized in that it has cooperating functional surfaces formed on the treatment assembly and the support structure so that they can enter into mutual contact to immobilize the treatment assembly against movement in translation to keep the complementary connectors interengaged with each other when the treatment assembly is mounted on the support structure and to allow the treatment assembly to be released by applying to it an action limited to tilting relative to the support structure, guided by the interengaged complementary connectors, to remove the treatment assembly from the support structure.

In other words, it is not necessary to push on the treatment assembly in order to release it. Thus in practice the risk of movement of the treatment system is entirely eliminated. Eliminating this pushing movement also simplifies the operation of removing the module.

For example, to form the cooperating surfaces, either the treatment assembly or the support structure includes at least one dihedron or at least one concave portion and either the support structure or the treatment assembly, whichever does not include at least one dihedron or at least one concave portion, includes at least one bevel or at least one convex portion having a configuration complementary to that of the dihedron or the concave portion, respectively.

Other cooperating surface configurations can be envisaged, of course, provided that they assure the functions defined above.

In one particular embodiment that is easy to put into practice, the support structure includes two face to face support arms each forming a bearing surface for a corresponding lateral extension of the treatment assembly.

This particular embodiment lends itself to implementation of the following preferred features, in particular for reasons of convenient fabrication and/or use of the assembly:

each lateral extension has a bevel or a convex portion and each support arm has a heel-piece that either forms with the bearing surface of its support arm a dihedron or has a concave portion extending between the bearing surface of its support arm and its summit; and/or each lateral extension includes an opening bordered by a bevel or a convex portion and preferably taking the form of a notch and a heel-piece of the corresponding support arm is adapted to be nested in the opening; and/or each support arm has a recess in its inside face that faces toward the inside face of the opposite support arm and forms the heel-piece and the bearing surface of the support arm; and/or each recess is bordered by an inclined plane for guiding the lateral extension associated with the support arm containing the recess toward the connectors of the feeding and receiving means and which overlies the bearing surface formed by the recess; and/or each support arm includes a notch extending the recess as far as the end of the support arm farthest away from the connectors of the feeding and receiving means and forming a bearing surface for the portion of the associated lateral extension that extends from the opening in the lateral extension to the longitudinal end thereof farthest away from the fluid inlet and outlet orifices of the connectors of the treatment assembly.

To prevent the feeding and receiving means from moving when the fluid treatment assembly is fitted, in particular if they take the form of a unit for producing purified water, the treatment assembly preferably includes a bearing member for each of a user's thumbs and each support arm includes a bearing member for at least some of the fingers of each hand of the user, these members being conformed and arranged so that they allow the user to move the treatment assembly with his thumbs to mount it on the support structure without moving the feeding and receiving means.

Conversely, each support arm further advantageously includes, at its end farthest away from the connectors of the feeding and receiving means, a bearing surface adapted to receive one of the user's thumbs in order to prevent the unit from moving when the treatment assembly is removed after its releasing.

To facilitate installing the treatment assembly, each heel-piece preferably has between its summit and its functional surface an inclined surface which faces the inclined plane and is adapted to guide the bevel or the convex portion of the associated lateral extension toward the corresponding dihedron or the corresponding concave portion, respectively, when the user tilts the treatment assembly.

In practice, the fluid treatment assembly includes at least one fluid treatment module accommodating fluid treatment means. This module can be an integral disposable unit.

The present invention is particularly beneficial in this situation because the operation of replacing a module is simplified as much as possible. Not only is the module simple to install and to remove, but also it is not necessary to work on the module itself to replace the treatment means accommodated in it.

The treatment means are means for treating the fluid by reverse osmosis, nanofiltration, ultrafiltration or tangential microfiltration, for example, and are housed in the fluid treatment module, or one of the modules if there is more than one.

The feeding and receiving means adapted to cooperate with the fluid treatment means can take the form of a unit for producing purified water or a fluid purification system as used in the semiconductor industry.

The present invention further provides a fluid treatment module including fluid inlet and outlet connectors communicating with the interior of the module, which accommodates fluid treatment means, which module is characterized in that it further includes at least one lateral extension having a functional surface conformed and arranged so that it allows the module to be removably mounted on a complementary support structure and immobilized thereon against movement in translation and also to be released by exerting thereon an action limited to tilting it relative to the support structure.

Preferred features of the above module, at least some of which can be combined, include:
    it includes a cylindrical enclosure defining an axis to which the connections are globally perpendicular;
    it includes two lateral extensions substantially parallel to the connectors and on respective opposite sides thereof and each including an opening that preferably takes the form of a notch and is bordered by a bevel or a convex portion defining the functional surface;
    it accommodates fluid treatment means for treating the fluid by reverse osmosis, nanofiltration, ultrafiltration or tangential microfiltration;
    it includes two bearing members for a user's thumbs at the longitudinal end of the module with the connectors and on the distal side thereof relative to the fluid inlet and outlet orifices of the connectors.

Finally, the invention provides a unit for feeding a fluid treatment assembly with fluid to be treated and receiving treated fluid, in particular for the production of purified water, the unit including fluid inlet and outlet connectors adapted to cooperate with complementary connectors of the treatment assembly when the latter is removably mounted on the unit, which unit is characterized in that it includes, for the purposes of mounting, two face to face support arms each having a bearing surface for the treatment assembly and a heel-piece having a functional surface conformed and adapted to immobilize the treatment assembly against movement in translation when the latter is mounted on the unit and to release the treatment assembly by exerting thereon an action limited to tilting it relative to the support arms.

The above unit has the following preferred features, at least some of which can be combined:
    the heel-piece forms with the bearing surface a dihedron defining the functional surface or has a concave portion extending between the bearing surface and the summit of the heel-piece and defining the functional surface;
    each support arm has, in its inside face that faces toward the inside face of the opposite support arm, a recess which forms the heel-piece and the bearing surface of the support arm;
    each recess is bordered by an inclined guide plane overlying the bearing surface formed by the recess;
    each support arm includes a bearing member for at least some of the fingers of one hand of the user;
    each support arm further includes a bearing surface for a thumb of the user at its end farthest away from the connectors of the unit;
    each heel-piece has an inclined guide surface extending between its summit and its functional surface and disposed opposite the inclined plane;
    each support arm includes a notch extending the recess as far as the end of the support arm farthest away from the connectors of the unit and forming an additional bearing surface for the treatment assembly which is coplanar with the other bearing surface for the treatment assembly.

The features and advantages of the invention will emerge from the following description, which is given by way of example and with reference to the accompanying diagrammatic drawings, in which:

FIGS. 4a to 4d are perspective views showing two support and female connector arms of a unit of the kind shown in FIG. 1 and a water treatment module of the kind also shown in FIG. 1, these figures showing various successive phases in the installation of the module;

FIGS. 5a to 5d are views to a larger scale and in section taken along the line V-V in FIG. 4a and correspond to FIGS. 4a to 4d, respectively;

Figure 1:
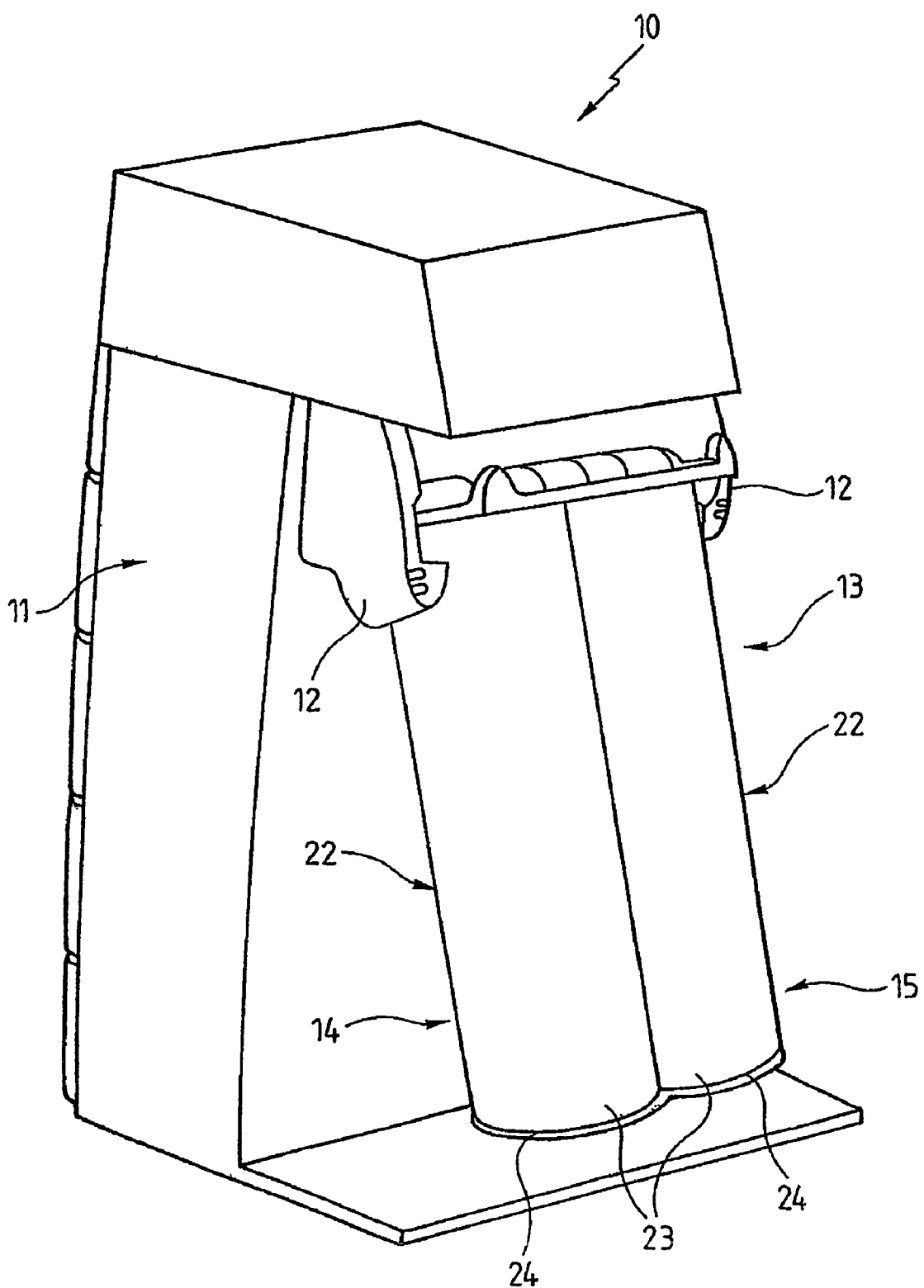
FIG. 1 is a perspective view of a unit for producing purified water and of a water treatment assembly in accordance with the invention.

The unit 10 for producing purified water shown in FIG. 1 includes an enclosure 11 with a support structure comprising two support arms 12 enabling the removable installation on the unit 10 of a water treatment assembly 13 which in this example includes, for producing purified water, an assembly of two water purification modules 14 and 15. Note that the modules 14 and 15 and the support structure 12 adapted to support them are shown more diagrammatically in FIG. 1 than in the subsequent figures.

The unit includes female connectors (which cannot be seen in FIG. 1) for feeding the modules 14 and 15 with water and for recovering the water treated by the modules 14 and 15.

The water feeding and treated water recovering means of the system according to the invention are therefore formed by the unit 10, and the modules 14 and 15 constitute the treatment assembly of the system.

In practice, untreated water is fed by the unit to the first module 14, which treats the water, and the unit 10 recovers the treated water in order to feed it to the second module 15, which also treats the water, but using different means from those used in the first module 14 (this is known as "polishing").

The module 15 is therefore filled with an ion exchange resin and the module 14 therefore houses a reverse osmosis cartridge, for example, as is the case in the embodiment shown.

As a result, the purified water recovered by the unit 10 at the outlet from the second module 15 is in practice ultrapure water.

It should also be noted that some accessories of the unit 10, such as a protective cap that covers the assembly 13, are not shown in FIG. 1, and that in this example each water treatment module 14, 15 is a disposable integral unit. To this end it is molded from a plastics material, as is the enclosure 11 of the purified water production unit 10.

The means for removably mounting the water treatment assembly 13 on the purified water production unit 10, so that the complementary connectors of the assembly 13 and the unit 10 interengage with each other to establish a flow of fluid from the unit 10 to the assembly 13 and vice versa, are described in more detail next.

Figure 2:
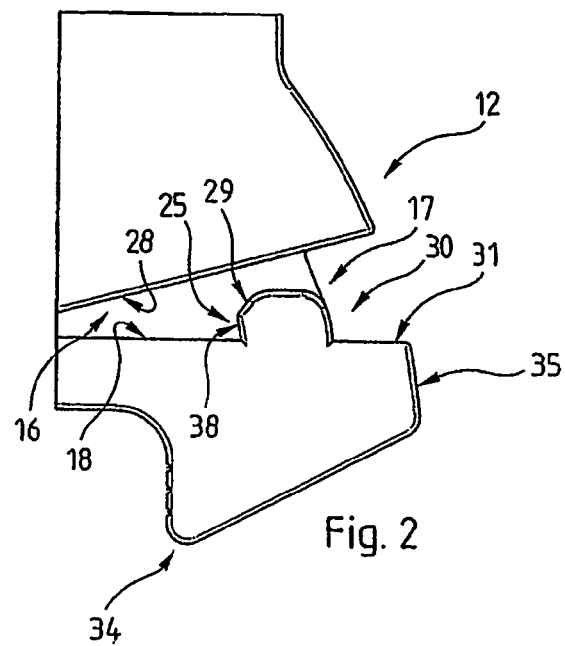
FIG. 2 is a view in elevation and to a larger scale of an internal face of a right-hand support arm of the unit shown in FIG. 1.

As can be seen more clearly in the case of one of them in FIG. 2, each of the face to face support arms 12 preferably has a recess 16 in its inside face facing toward the inside face of the opposite support arm 12, which recess forms a heel-piece 17 and a bearing surface 18 adapted to cooperate with the module 14, 15 associated with the support arm 12.

Figure 3:
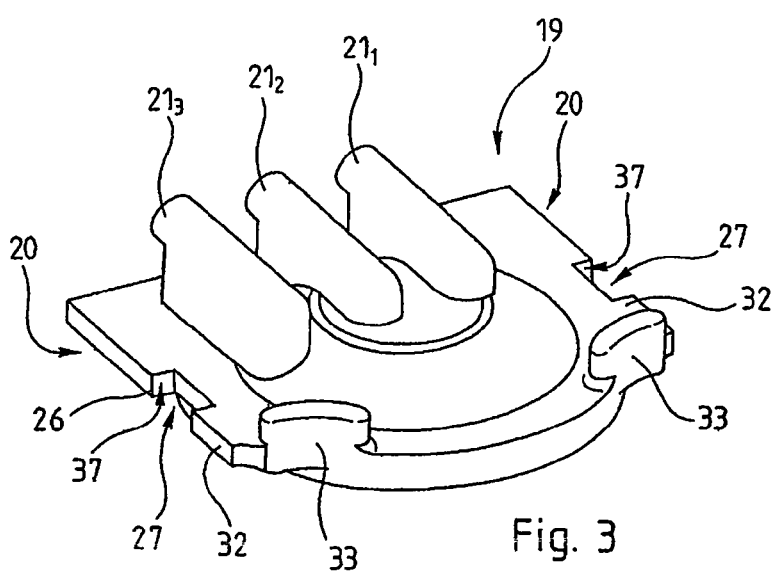
FIG. 3 is a perspective view to a larger scale of a head of a water treatment module of the treatment assembly shown in FIG. 1.
Figure 4D:
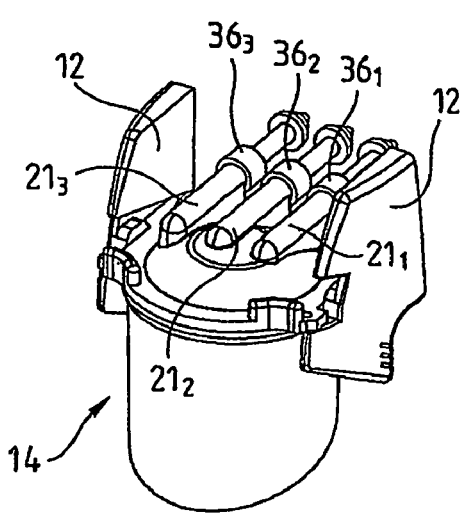
Figure 5D:
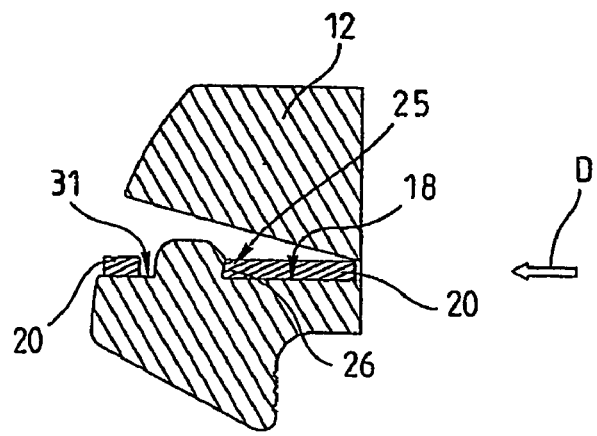

To be more precise, and as shown more clearly in FIG. 3, each module 14, 15 has a head 19 with two lateral extensions 20 extending in the same direction as three parallel male connectors $21_1$-$21_3$ of the head 19, and on respective opposite sides thereof. The lateral extensions 20 are adapted to cooperate with the support arms 12, as described in more detail below.

First, however, it should be pointed out that, in the embodiment shown, each module 14, 15 includes a container 22 having a substantially cylindrical jacket or wall 23 closed at a first axial end by the head 19 for connecting the module 14, 15 to the water purification unit 10 and at its second axial end by a bottom 24.

In practice, the head 19 is permanently fixed to the cylindrical enclosure 23, in this example by welding them together by melting their annular edges to fuse them together, and the bottom 24 is molded in one piece with the cylindrical enclosure 23 from a plastics material. This produces the integral container forming the disposable module 14, 15.

The male connectors $21_1$-$21_3$ of each module 14, 15 provide a one way connection, are globally perpendicular to the axis of the cylindrical enclosure 23 (not shown in the figures), and communicate separately with the interior of the module 14, 15. The male connectors $21_1$-$21_3$ are adapted to be nested inside the female connectors of the unit 10 to establish a flow of water from the purified water production unit 10 to the treatment assembly 13 and vice versa, rubber seals (which cannot be seen in the figures) sealing the combinations of male and female connectors.

According to the invention, the fluid treatment system comprising the purified water production unit 10 and the water treatment assembly 13 generally has cooperating functional surfaces on the treatment assembly 13 and on the support structure, which in this example consists of the two support arms 12, so that they can come into mutual contact to immobilize the treatment assembly 13 against movement in translation, to hold the complementary connectors of the treatment assembly 13 and the purified water production unit 10 interengaged with each other when the treatment assembly 13 has been mounted on the support structure 12 and to allow the treatment assembly 13 to be released by exerting on it an action limited to tilting it relative to the support structure 12, this tilting being guided by the complementary connectors interengaged with each other, in order to remove the treatment assembly 13 from the purified water production unit 10.

To form the respective cooperating surfaces, the support structure 12 and the treatment assembly 13 preferably include at least one dihedron 25 and at least one bevel 26 having a configuration complementary to that of the dihedron 25, as is the case in the embodiment shown in FIGS. 1 to 3.

To be more precise, and as already stated hereinabove, each support arm 12 includes a plane bearing surface 18 for a corresponding lateral extension 20 of one of the modules 14, 15 of the treatment assembly 13 and a heel-piece 17. The heel-piece and the bearing surface 18 of the support arm 12 together form the dihedron 25.

An opening 27 bordered by a bevel 26, and in this example taking the form of a notch, is formed in each lateral extension 20 of the modules 14 and 15, the heel-piece 17 of the corresponding support arm 12 being adapted to nest in the opening 27. It should be noted that, in the embodiment shown in FIGS. 1 to 3, the two lateral extensions 20 of the modules 14 and 15 in fact assemble them together to form the treatment assembly 13, and the two lateral extensions 20 farthest away from each other are each adapted to cooperate with a corresponding support arm 12.

In practice, each dihedron 25 defines an angle from 60° to 85°. The angle is preferably from 70° to 80°, and in the preferred embodiment shown in FIGS. 1 to 3 the angle is 79°. The values chosen for the angles defined by the bevels 26 are in practice identical or substantially identical to the angles defined by the dihedra 25.

Note further that in practice each dihedron 25 faces toward the connectors of the purified water production unit 10 and the bevels 26 and the connectors of each module 14, 15 face in opposite directions.

In the embodiment shown in FIGS. 1 to 3, each recess 16 is also bordered by an inclined plane 28 overlying the bearing surface 18 formed by the recess 16 and adapted to guide the lateral extension 20 associated with the support arm 12 incorporating the recess 16 toward the connectors of the purified water production unit 10.

Each heel-piece 17 also has an inclined surface 29 between its summit and the dihedron 25 that it forms with the bearing surface 18 of its support arm 12, which faces the inclined plane 28 on the same support arm 12 and is adapted to guide the bevel 26 of the associated lateral extension 20 toward the corresponding dihedron 25 when a user tilts the treatment assembly.

Each support arm 12 further includes a notch 30 extending the recess 16 as far as one end of the support arm 12 farthest away from the connectors of the unit 10 and forming a bearing surface 31 for the portion 32 of the associated lateral extension 20 that extends from the opening 27 of the lateral extension 20 to the longitudinal end thereof farthest away from the connectors $21_1$-$21_3$.

In practice the bearing surfaces 18 and 31 are coplanar and the bearing surface 31 extends from the rear end of the heel-piece 17 to the free end of the corresponding support arm 12 farthest away from the connectors of the unit 10.

The invention lends itself with advantage to an improvement whereby the treatment assembly 13 includes a bearing member for each thumb of the user and each support arm includes a bearing member for at least some of the fingers of each hand of the user, these members being shaped and arranged so that the user can move the treatment assembly 13 with his thumbs to mount it on the unit 10 without moving the latter.

In the embodiment shown in FIGS. 1 to 3, each module 14, 15 includes two circular arc-shaped projections 33 upstanding vertically on the head 20 of the module 14, 15 and each extending from the longitudinal end of the lateral extension 20 farthest away from the fluid inlet and outlet orifices of the connectors $21_1$-$21_3$ toward the opposite projection 33 and the longitudinal end of the head 20 farthest away from the aforementioned inlet and outlet orifices.

The portion of each support arm 12 extending under the recess 16 is the shape of a pistol butt 34 forming a bearing member for at least some of the fingers of the corresponding hand of the user.

It will be seen that, in practice, in the embodiment shown in FIGS. 1 to 3, only the two projections 33 adjoining the lateral extensions adapted to cooperate with the support arms 12 are used when installing the module 14, 15 on the purified water production unit 10.

In a similar manner, to prevent the purified water production unit 10 moving when the treatment assembly 13 is removed from the support structure 12, after releasing the treatment assembly 13, the portion 34 in the shape of a pistol butt of each support arm 12 further includes, at its end farthest away from the connectors of the purified water production unit 10, a bearing surface 35 adapted to receive one of the user's thumbs.

The benefits of ergonomic features of the bearing members 33 and 34 and the fact that they also facilitate installing and removing the treatment assembly 13 are evident.

FIGS. 4a to 4d and 5a to 5d show the various steps of mounting this kind of treatment assembly on a purified water production unit.

The treatment assembly shown in these figures includes only one module, similar to the module 14 or 15.

For clarity, the module shown in these figures is identified by the reference number 14, and the reference numbers used in FIGS. 1 to 3 have been used again for FIGS. 4a to 4d and 5a to 5d.

The same applies to the purified water production unit shown in these figures, which is similar to the unit 10 shown in FIG. 1, and of which only the support arms 12 and the female connectors $36_1$-$36_3$ are shown in FIGS. 4a to 4d and 5a to 5d.

Initially, the user offers up the module 14 between the two support arms 12, and then inserts the lateral extensions 20 of the module 14 into the notches 30 in the support arms 12.

He then inserts the lateral extensions 20 into the recesses 16, passing them between the summit of the heel-piece 17 and the inclined plane 28 of the support arms 12.

As shown in FIGS. 4a and 5a, he then pushes the module 14 forward, between the support arms 12, the inclined planes 28 guiding the lateral extensions 20 so that they move substantially in translation toward the female connectors $36_1$-$36_3$ (arrow A).

When the user feels the resistance caused by the penetration of the male connectors $21_1$-$21_3$ of the module 14 into the female connectors $36_1$-$36_3$, he starts to tilt the module 14 downward. To this end, the user can advantageously place his thumbs on the projections 33 of the module 14 and some or all of his fingers on the portions 34 of the support arms 12 in the shape of a pistol butt. This enables him to engage the module 14 easily without moving the unit, by "squeezing together" the module 14 and the portions 34 in the shape of a pistol butt (primarily the front surfaces thereof facing toward the unit).

As can be seen in FIGS. 4b and 5b, during this tilting (arrow B), each inclined surface 29 of a heel-piece 17 operates like a cam on the bevel 26 of the lateral extension 20 associated with the corresponding support arm 12 to guide the bevel 26 toward the corresponding dihedron 25 and thereby to assist the nesting of the male connectors $21_1$-$21_3$ in the female connectors $36_1$-$36_3$ (arrow C).

As can be seen in FIGS. 4c and 5c, the user tilts the module 14 until the lateral extensions 20 rest entirely on the bearing surfaces 18 and 31 of the corresponding support arms 12. At this stage, the male connectors $21_1$-$21_3$ are totally nested inside the female connectors $36_1$-$36_3$.

When the unit is started up (see FIGS. 4d and 5d), the pressure of the water flowing in the complementary connectors interengaged with each other causes the module 14 to move away from the unit (arrow D), as a consequence of which the inclined functional surface 37 defined by each bevel 26 abuts against the inclined functional surface 38 defined by the associated dihedron 25, thereby immobilizing the module 14 against movement in translation on the unit when in use (the module 14 is locked by virtue of the bevels 26 and the dihedra 25 being interengaged with each other).

Figure 6A:
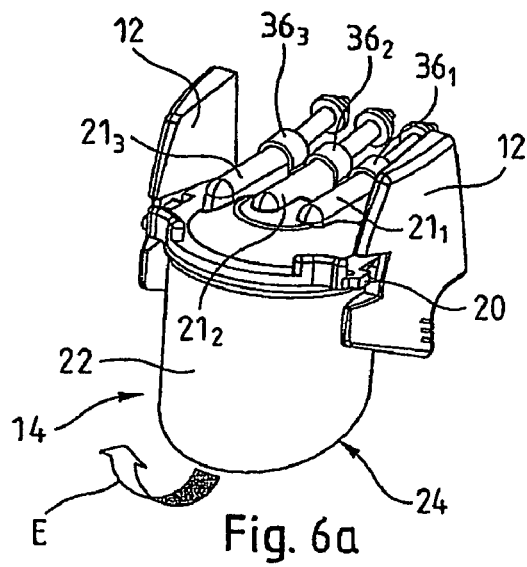
FIGS. 6a and 6b are perspective views similar to those of FIGS. 4a to 4d and show two phases in the removal of a water treatment module.

The module 14 is released by exerting on it an action limited to tilting it relative to the support arms 12 in the opposite direction, guided by the interengaged complementary male connectors $21_1$-$21_3$ and female connectors $36_1$-$36_3$ (see arrow E, FIG. 6a). To this end, the user can advantageously apply pressure to the module 14 in the vicinity of its bottom 24 and thereby obtain the benefit of a long lever arm.

Figure 7A:
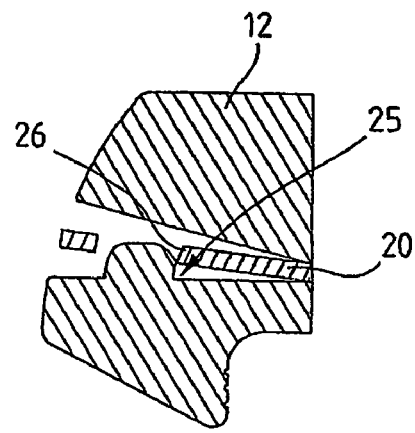
FIGS. 7a and 7b are views in section similar to FIGS. 5a to 5d and corresponding to FIGS. 6a and 6b, respectively.

As can be seen in FIGS. 6a and 7a, this simple tilting action disengages each bevel 26 from the corresponding dihedron 25 and the module 14 can therefore be released by a single, simple action on the module 14.

The user then has only to extract the module 14 from the support structure consisting of the two support arms 12. To this end, he can advantageously place his thumbs on the bearing surfaces 35 and some or all of his fingers on the container 22 of the module 14, on the side of the container 33 facing toward the unit and in the vicinity of the bottom 24 of the container 33, with the same action previously used to tilt the module 14.

Figure 6B:
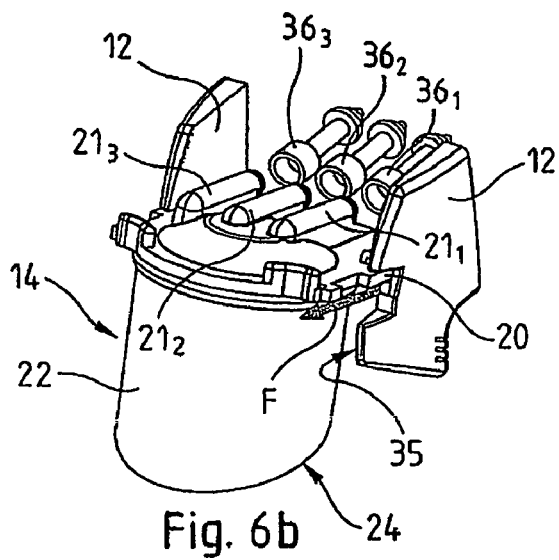
Figure 7B:
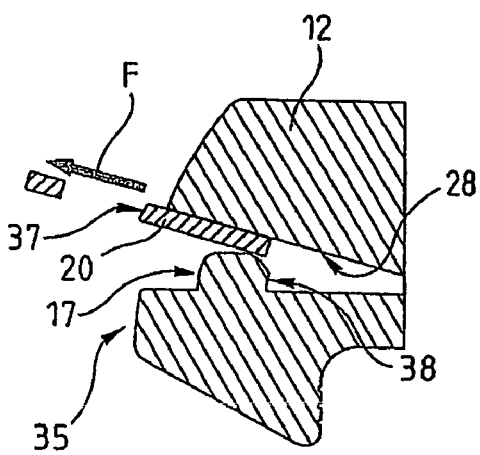

As can be seen in FIG. 7b, the inclined planes 28 again guide the lateral extensions 20 so that the module 14 moves substantially in translation (arrow F, FIGS. 6b and 7b).

Of course, the present invention is not limited to the embodiment described and shown and encompasses any variant execution thereof.

In particular, other configurations of the cooperating functional surfaces can be envisaged.

Figure 8:
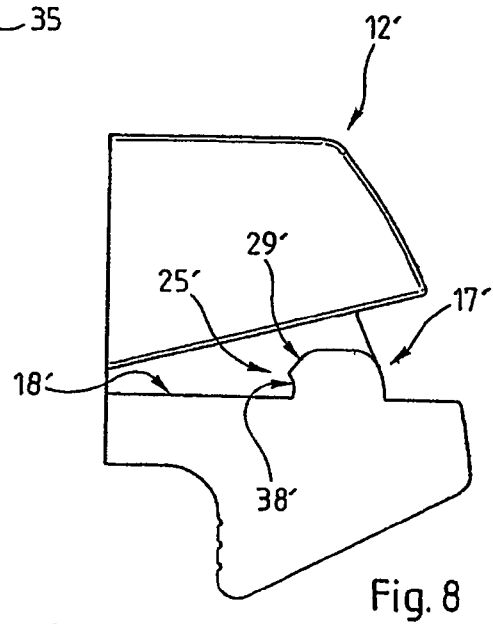
FIG. 8 is a view in elevation of the internal face of a support arm of a different embodiment of the invention.

For example, the support arm 12' shown in FIG. 8 includes a heel-piece 17' having a concave portion 25' defining a functional surface 38' extending between the bearing surface 18' of the arm and the inclined surface 29' of the heel-piece 17' similar to the inclined surface 29 of the heel-piece 17. The functional surface 38' has the same function as the functional surface 38 of the heel-piece 17 and is adapted to cooperate with a functional surface defined by a complementary convex portion (not shown in the drawings) of a lateral extension of the associated module.

The invention claimed is:

1. A fluid treatment system including a fluid treatment assembly and means for feeding the treatment assembly with fluid to be treated and receiving treated fluid, the means including a support structure on which the treatment assembly is adapted to be removably mounted to interengage with each other complementary connectors of the treatment assembly and the feeding and receiving means to establish a flow of fluid from the feeding and receiving means toward the treatment assembly and vice versa, comprising the system has cooperating functional surfaces formed on the treatment assembly and the support structure so that they can enter into mutual contact to immobilize the treatment assembly against movement in translation to keep the complementary connectors interengaged with each other when the treatment assembly is mounted on the support structure and to allow the treatment assembly to be released by applying to it an action limited to tilting relative to the support structure, guided by the interengaged complementary connectors, to remove the treatment assembly from the support structure and wherein the support structure includes two face to face support arms each forming a bearing surface for a corresponding lateral extension of the treatment assembly and each lateral extension includes an opening bordered by a bevel or a convex portion and preferably taking the form of a notch, and a heel-piece of the corresponding support arm is adapted to be nested in the opening.

2. A fluid treatment system including a fluid treatment assembly and means for feeding the treatment assembly with fluid to be treated and receiving treated fluid, the means including a support structure on which the treatment assembly is adapted to be removably mounted to interengage with each other complementary connectors of the treatment assembly and the feeding and receiving means to establish a flow of fluid from the feeding and receiving means toward the treatment assembly and vice versa, comprising the system has cooperating functional surfaces formed on the treatment assembly and the support structure so that they can enter into mutual contact to immobilize the treatment assembly against movement in translation to keep the complementary connectors interengaged with each other when the treatment assembly is mounted on the support structure and to allow the treatment assembly to be released by applying to it an action limited to tilting relative to the support structure, guided by the interengaged complementary connectors, to remove the treatment assembly from the support structure and wherein the support structure includes two face to face support arms each forming a bearing surface for a corresponding lateral extension of the treatment assembly and each support arm has a recess in its inside face that faces toward the inside face of the opposite support arm and forms the heel-piece and the bearing surface of the support arm and each heel-piece has a summit, a functional surface, and an inclined surface between the summit and the functional surface, the inclined surface faces a support structure inclined plane and the inclined surface is adapted to guide a bevel or a convex portion of the associated lateral extension of the treatment assembly toward a corresponding dihedron or a corresponding concave portion of the support structure, respectively, when the user tilts the treatment assembly.

3. A fluid treatment system including a fluid treatment assembly and means for feeding the treatment assembly with fluid to be treated and receiving treated fluid, the means including a support structure on which the treatment assembly is adapted to be removably mounted to interengage with each other complementary connectors of the treatment assembly and the feeding and receiving means to establish a flow of fluid from the feeding and receiving means toward the treatment assembly and vice versa, comprising the system has cooperating functional surfaces formed on the treatment assembly and the support structure so that they can enter into mutual contact to immobilize the treatment assembly against movement in translation to keep the complementary connectors interengaged with each other when the treatment assembly is mounted on the support structure and to allow the treatment assembly to be released by applying to it an action limited to tilting relative to the support structure, guided by the interengaged complementary connectors, to remove the treatment assembly from the support structure and wherein the support structure includes, for the purposes of mounting, two face to face support arms each having a bearing surface for the treatment assembly and said support structure includes a heel-piece having a functional surface conformed and adapted to immobilize the treatment assembly against movement in translation when the latter is mounted on the bearing surface of the support structure and to release the treatment assembly by exerting thereon an action limited to tilting it relative to the support arms, and the heel-piece forms with the bearing surface a dihedron defining the functional surface.

4. The system of claim 3 wherein each support arm has, in its inside face that faces toward the inside face of the opposite support arm, a recess which forms the heel-piece and the bearing surface of the support arm.

5. The system of claim 3 wherein each support arm has, in its inside face that faces toward the inside face of the opposite support arm, a recess which forms the heel-piece and the bearing surface of the support arm and each recess is bordered by an inclined guide plane overlying the bearing surface formed by the recess.

6. The system of claim 3 wherein each support arm has, in its inside face that faces toward the inside face of the opposite support arm, a recess which forms the heel-piece, the bearing surface of the support arm and each recess is bordered by an inclined guide plane overlying the bearing surface formed by the recess and each support arm includes a bearing member for at least some of the fingers of one hand of the user.

7. The system of claim 3 wherein each support arm has, in its inside face that faces toward the inside face of the opposite support arm, a recess which forms the heel-piece and the bearing surface of the support arm and each recess is bordered by an inclined guide plane overlying the bearing surface formed by the recess and each support arm includes a bearing surface for a thumb of the user at its end farthest away from the connectors of the support structure.

8. The system of claim 3 wherein each support arm has, in its inside face that faces toward the inside face of the opposite support arm, a recess which forms the heel-piece and the bearing surface of the support arm and each recess is bordered by an inclined guide plane overlying the bearing surface formed by the recess and each heel-piece has an inclined guide surface extending between its summit and its functional surface and disposed opposite the inclined plane.

9. The system of claim 3 wherein each support arm has, in its inside face that faces toward the inside face of the opposite support arm, a recess which forms the heel-piece and the bearing surface of the support arm and each recess is bordered by an inclined guide plane overlying the bearing surface formed by the recess and each support arm includes a notch extending the recess as far as the end of the support arm farthest away from the connectors of the support structure and forming an additional bearing surface for the treatment assembly which is coplanar with the other bearing surface for the treatment assembly.

* * * * *

UNITED STATES PATENT AND TRADEMARK OFFICE
CERTIFICATE OF CORRECTION

PATENT NO.      : 7,578,936 B2                          Page 1 of 1
APPLICATION NO. : 10/524383
DATED           : August 25, 2009
INVENTOR(S)     : Gaignet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Fourteenth Day of September, 2010

David J. Kappos
*Director of the United States Patent and Trademark Office*